United States Patent [19]

Miller et al.

[11] Patent Number: 5,378,478
[45] Date of Patent: Jan. 3, 1995

[54] MANUFACTURE OF CHEESE PRODUCTS WITH POLYOL POLYESTER FAT SUBSTITUTES

[75] Inventors: Mark S. Miller, Arlington Heights; Kevin J. Surber, Lombard, both of Ill.

[73] Assignee: Kraft General Foods, Inc., Northfield, Ill.

[21] Appl. No.: 175,612

[22] Filed: Dec. 30, 1993

[51] Int. Cl.6 .............................. A23C 20/00
[52] U.S. Cl. ...................... 426/40; 426/39; 426/36; 426/330.2; 426/582; 426/804
[58] Field of Search ............ 426/36, 37, 38, 39, 426/40, 330.2, 582, 804

[56] References Cited

U.S. PATENT DOCUMENTS

| | | | |
|---|---|---|---|
| 4,018,752 | 4/1977 | Buhler | 426/36 |
| 4,268,528 | 5/1981 | Montegny | 426/36 |
| 4,271,201 | 6/1981 | Stenne | 426/582 |
| 4,355,048 | 10/1982 | Schaap | 426/40 |
| 4,518,616 | 5/1985 | Czulak | 426/582 |
| 4,948,599 | 8/1990 | Sagara | 426/582 |
| 4,980,179 | 12/1990 | Koenraads | 426/582 |
| 5,061,503 | 10/1991 | Kong-Chan et al. | 426/582 |
| 5,061,504 | 10/1991 | Kong-Chan et al. | 426/582 |
| 5,064,674 | 11/1991 | Klemann | 426/582 |
| 5,080,912 | 1/1992 | Bodenstein et al. | 426/33 |

Primary Examiner—Carolyn Paden
Attorney, Agent, or Firm—Fitch, Even, Tabin & Flannery

[57] ABSTRACT

The present invention is directed to a method for the manufacture of a natural cheese. In the method, moisture, salts and lactose are removed from skim milk by ultrafiltration and diafiltration to provide a retentate having between about 60% and about 85% moisture, between about 0.7% and about 2.5% salts, and less than about 1.8% lactose. A lactic acid producing cheese culture is then added to the retentate and the retentate is fermented to a pH of between about 4.8 and about 5.6. The fermentation is effected without coagulating the retentate. An emulsion is then prepared by homogenizing a mixture of an aqueous material and a fat. The emulsion contains from about 10% to about 70% fat. The fat comprises from about 25% to 100% of a polyol fatty acid polyester with the balance being a triglyceride fat. The fermented retentate and the emulsion are then blended together. A milk clotting enzyme is added to the blend and the blend is immediately subjected to evaporation. Moisture is evaporated from the blend to provide a pre-cheese having from about 45% to about 60% solids. The pre-cheese is then cured to provide a natural cheese having a fat level of from about 7% to about 45%.

19 Claims, No Drawings

MANUFACTURE OF CHEESE PRODUCTS WITH POLYOL POLYESTER FAT SUBSTITUTES

FIELD OF THE INVENTION

The present invention relates generally to the manufacture of cheese products from skim milk and a fat source which is relatively non-digestible. More particularly, the present invention relates to a process for the manufacture of cheese products wherein a polyol fatty acid polyester is used as a substitute for a portion or all of the milk fat normally present in the cheese product.

BACKGROUND OF THE INVENTION

There is an ever increasing interest among consumers in food products which contain less total fat, saturated fat, cholesterol and calories. Such products are useful in controlling body weight and reducing the risk of heart and artery disease.

Traditional full-fat cheese products which contain butterfat generally contain from about 15% to about 35% fat, from about 50 mg to about 100 mg cholesterol per 100 g, and from about 300 to about 400 calories per 100 g. Because of this high fat and calorie content, there has long been a significant need for cheese analogs which have a substantially reduced fat and reduced calorie content and yet which provide the gustatory and physical properties of conventional butterfat-containing cheese analogs.

For many years, synthetic cheese analogs have been made wherein the butterfat traditionally present in full-fat cheese was replaced with an alternative, less expensive, animal or vegetable fat. In almost all cases, the synthetic cheeses are offered at lower cost, which was probably the most important single factor in the initial acceptance of synthetic dairy foods. Another beneficial aspect of synthetic cheese analogs is the fact that many such products can be produced with an extended shelf life. With the increased awareness of the dangers of cholesterol found in animal fats, synthetic cheese analogs wherein the butterfat is replaced with a vegetable fat have gained increased popularity. The term "animal fats" as used herein encompasses the fats derived from dairy, fish or meat sources.

Synthetic cheeses are made utilizing aged or non-aged low-fat cheese, vegetable-derived protein such as soy or soy isolate, or commercially available dry powdered protein derived from fresh, whole or skim milk, buttermilk or cream such as, for example, sodium or calcium caseinate. Synthetic cheese products using proteinaceous materials derived from vegetable sources are described in U.S. Pat. No. 4,684,533 to Kratochvil; U.S. Pat. No. 4,678,676 to Ishizuka, et al. and U.S. Pat. No. 3,806,606 to Seiden. Synthetic cheese products made from a commercially available dry powdered protein derived from fresh whole milk are described in the following patents: Canadian Pat. 952,761 to Roe; U.S. Pat. No. 3,941,891 to Kasik, et al.; U.S. Pat. No. 4,197,322 to Middleton and U.S. Pat. No. 4,397,926 to Galal, et al. Finally, conventional synthetic cheese utilizing skim milk cheese, a non-aged low-fat cheese, is described in U.S. Pat. No. 2,604,405 to Petersen, herein incorporated by reference.

U.S. Pat. No. 5,080,912 to Bodenstein, et al. describes a process for preparing a cheese product wherein a polyol fatty acid polyester is substituted for a portion of the milk fat usually present in cheese. In the method of the Bodenstein, et al. patent, a water and oil containing filled milk is prepared containing polyol fatty acid polyesters as a portion of the filled milk. After homogenization, a cheese milk is prepared by combining the filled milk with an aqueous composition containing at least 2 weight percent milk protein. A starter culture and/or a milk coagulant is added to the cheese milk and the cheese milk is permitted to coagulate. The coagulum is cut to provide curd particles and whey and the whey is separated from the curd as in conventional cheese making processes.

U.S. Pat. Nos. 5,061,503 and 5,061,504 to Kong-Chan, et al. are directed to simulated cheese products with reduced animal fat and calories. The cheese products of the Kong-Chan, et al. patents contain from about 5% to about 50% of protein obtained from aged low-fat cheese, non-aged low-fat cheese, aged full-fat cheese, non-aged full-fat cheese, dry-powdered protein derived from fresh whole milk, skim milk, buttermilk, vegetable protein and mixtures thereof. The cheese products also contain from about 4% to about 35% of a fatty substance. From about 30% to 100% of the fatty substance is a low calorie fatty material with the balance being animal fat or vegetable fat. The fatty material is selected from a low-calorie fatty material which is a polyester of a sugar or sugar alcohol, or a tailored triglyceride in which the esterifying acids are a mixture of long chain and medium chain triglycerides.

The manufacture of cheese or cheese base materials from milk through preparation of a retentate by removal of salts, lactose and water has been taught in various patents and literature references. For example, U.S. Pat. No. 3,988,481 to Coulter, et al., teaches the preparation of cheese from milk which has been delactosed and dewatered by a processing involving molecular sieving a standardized milk to substantially separate and remove lactose and water-soluble minerals from the milk to render the milk substantially sugar-free, and adding a curd-forming agent to produce curd. The resulting curd is subjected to conventional handling without substantial syneresis to produce a cheese, and molded to a desired form.

U.S. Pat. No. 3,899,596 to Stenne discloses a process for the production of cheese which comprises treating milk by ultrafiltration to obtain a product having at least some of the protein constituents of the milk, renneting the liquid product after inoculation with suitable ferments, and introducing a batch of the renneted liquid into a vertical chamber in which it is left to coagulate. The coagulum is cut into slabs which provide the end product cheese. U.S. Pat. No. 3,914,435 to Maubois, et al. teaches cheese made from heat-treated milk and without conventional draining of whey by a process which involves ultrafiltering of the milk to produce a concentrate having essentially the composition of cheese produced by conventional whey draining processes. The process enables the milk, after ultrafiltration, to be heat-treated without making the milk more difficult to coagulate with rennet, which difficulty normally occurs when milk is heated to high temperature.

U.S. Pat. No. 4,244,971 to Wargel, et al. teaches the manufacture of cheeses and process cheese, from ultrafiltered milk.

U.S. Pat. No. 4,401,679 to Rubin, et al. discloses a process for preparing cheese base by concentrating milk through ultrafiltration, combined with diafiltration and evaporation, wherein the retentate from the ultrafiltration is inoculated with an acid culture before evaporation, and after evaporation acidification proceeds to completion in packing.

Further, cheese base material has been taught by evaporating moisture from retentate under turbulent conditions to provide a lower moisture condition. Such a process is described in an article by Ernstrom, et al., "Cheese Base for Processing: A High-Yield Product from Whole Milk by Ultrafiltration", published in the *Journal of Dairy Science*, Volume 63, 228–234 (1980). The article teaches a process wherein whole milk of normal pH, or acidified to a pH of 5.7, is concentrated by ultrafiltration to about 40 percent of the original milk weight and diafiltered at constant volume until a desired ratio of lactose to buffer capacity is established. Then the retentate is further concentrated by ultrafiltration to 20 percent of the original milk weight. The retentate is then inoculated with cheese starter and incubated to completely ferment the residual lactose, pH control being achieved by controlling the level of lactose remaining after a diafiltration step in the process. The product is further concentrated in a swept-surface vacuum-pan evaporator or a continuous-flow Luwa evaporator. It is pointed out that the use of a batch evaporator is necessitated when the retentate, upon fermentation, curdles or coagulates, since such a product cannot be readily processed in any continuous-flow evaporator.

It is known to add salt during fermentation to prevent coagulation and this was understood many years ago. See, LeLait, November–December, 1974, No. 539–540. Further, it has been disclosed that salt in the retentate may facilitate evaporation as disclosed in an Australian patent application, which is the subject of a published application under the Pat. Cooperation Treaty WO82/01806, published Jun. 10, 1982.

The prior art teaches that the addition of rennet or other coagulating enzymes to high-solids milk systems causes rapid coagulation, a condition to be avoided during evaporation, of a retentate, since the evaporation is highly inefficient after coagulation occurs. On the other hand, the presence of coagulating enzymes is desired in hard or high-solids cheese to provide the conventional presence of para kappa casein.

In the conventional making of cheese with rennet, the macro peptides formed by rennet action are lost in the whey with consequent reduction in yield and loss of nutritious milk protein material. Accordingly, it would be desirable to enjoy the benefit of rennet action while avoiding whey removal with consequent loss of macro peptides.

Further, prior art methods for making cheese products at high-solids with evaporation, in which evaporation is effected with high turbulence or the cheese base material is recovered with substantial working after evaporation, has resulted in oiling-off or destabilization of higher-solids cheese and a body and texture unlike various cheeses. This destabilization is particularly noticeable at total solids in excess of about 60 to about 62 percent, e.g., a cheese such as cheddar cheese, but is also present at solids as low as 55 percent. Accordingly, cheese base materials heretofore produced by evaporating retentates to a total solids in excess of 60 percent have not provided the typical body and texture characteristics of high-solids cheeses.

Despite the many teachings of the prior art relating to the manufacture of cheese products and cheese-based materials from retentates derived from milk, there has been no prior art teaching of a process for producing higher-solids cheese wherein the milk fat is replaced with a non-digestible fatty material, such as polyol fatty acid polyester.

Accordingly, it is an object of the present invention to provide a cheese product which is stable and does not oil-off and is manufactured by processing a retentate with evaporation techniques and which contains a polyol fatty acid polyester as a substitute for at least a portion of the triglyceride fat normally present in cheese analogs.

It is another object of the present invention to provide a cheese analog from a retentate by means of evaporation techniques, the cheese being stable and capable of having typical body and texture characteristics associated with a natural cheese.

It is a further object of the present invention to provide a cheese analog with reduced levels of digestible fat which is suitable for use in the manufacture of processed cheese.

SUMMARY OF THE INVENTION

The present invention is directed to a method for the manufacture of a natural cheese. In the method, moisture, salts and lactose are removed from skim milk by ultrafiltration and diafiltration to provide a retentate having between about 60% and about 85% moisture, between about 0.7% and about 2.5% salts, and less than about 1.8% lactose. A lactic acid producing cheese culture is then added to the retentate and the retentate is fermented to a pH of between about 4.8 and about 5.6. The fermentation is effected without coagulating the retentate. An emulsion is then prepared by homogenizing a mixture of an aqueous material and a fat. The emulsion contains from about 10% to about 70% fat. The fat comprises from about 25% to 100% of a polyol fatty acid polyester with the balance being a triglyceride fat. The fermented retentate and the emulsion are then blended together. A milk clotting enzyme is added to the blend and the blend is immediately subjected to evaporation. Moisture is evaporated from the blend to provide a pre-cheese having from about 45% to about 60% solids. The pre-cheese is then cured to provide a natural cheese having a fat level of from about 7% to about 45%.

DETAILED DESCRIPTION OF THE INVENTION

In accordance with this invention, skim milk is treated by known processes to provide a retentate having between about 85% and about 70% moisture; between about 0.7% and about 1.5% salts and less than about 1.8% lactose with balance of the solids being milk protein and a minor amount of milk fat.

Various techniques are known in the art for achieving the indicated retentate; for example, ultrafiltration, with or without diafiltration. Commercial apparatus is marketed and available for the preparation of such retentates, and the apparatus is in present use in the cheese industry. The operation of such apparatus is believed to be within the skill of the art. Preferably, in the practice of the invention, the milk is treated by ultrafiltration and diafiltration to provide the desired level of constituents in the retentate.

The total solids of the skim milk retentate should not be so high as to result in gelation of the retentate during processing. It has been found that the total solids content of the retentate made from skim milk, for best operation, should be less than about 40% and should be greater than 15%, preferably the solids of the retentate are between about 20% and about 25%.

The retentate is then fermented by mixing with conventional cheese cultures or starters, and particularly those commercially available and normally used in the manufacture of American-type cheeses, such as *Streptococcus lactis, Streptococcus cremoris* and other well known organisms. The term American-type cheese is meant to include cheddar cheese. The retentate may have enzymes added to enhance flavor in the end product, such as certain lipases and proteases which hydrolyze fat and protein in the retentate. The enzymes also reduce viscosity in the system which serves to avoid gelation in the process. These enzymes are known to the cheese industry and their addition has been previously disclosed in the manufacture of cheese.

The fermentation is continued until the acid in the retentate has lowered the pH to the range of between about 4.8 and about 5.6. To a great extent, the pH is self controlled by the low lactose level provided in the preparation of the retentate. The lactose level in the retentate is less than about 1.8%, as compared to a lactose level of about 5% in the starting skim milk. It is preferred that the fermentation be controlled in such a manner as to prevent coagulation. This may be achieved in different ways as by having lower total solids in the retentate or, as has been known for many years, by the inclusion of salts, such as sodium chloride, at the fermentation step.

Incorporation of the fat phase, comprising polyol fat acid polyester alone or blended with triglyceride fats, can be accomplished by providing the fat in the form of an emulsion containing from about 10% to about 70% fat, preferably from about 40% to about 50% fat. It is desirable to make the emulsion with the highest practical concentration of fat to minimize dilution of the retentate. The upper limit of the fat concentration is determined by the viscosity of the resulting emulsion, which ultimately affects its ability to be pumped and blended through the remaining steps of the cheesemaking process. The concentration should be that of a heavy cream or plastic cream. Typical sweet cream for manufacturing has a concentration of about 42% fat with greater than 45% total solids. Plastic cream contains about 70% fat. The preferred emulsion composition of the invention contains about 40% to about 50% fat phase blended with about 50% to about 60% of a nonfat liquid dairy product or water.

The nonfat liquid dairy component of the emulsion includes skim milk, whey and buttermilk. The source of the skim milk component may be skimmed whole milk, condensed skim milk, ultrafiltered skim milk, ultrafiltered and diafiltered skim milk or ultrafiltered, diafiltered and fermented skim milk. The preferred source of skim milk is fermented skim milk, in which case a portion of the previously described retentate is used for the formation of the emulsion. The source of the whey component may be various preparations of sweet whey from manufacture of natural cheese products such as cheddar or mozzarella, or acid whey from cream cheese, cottage cheese or quark manufacture. Whole whey, concentrated whey, lactose-reduced whey protein concentrate, or whey protein isolates are suitable for use as the aqueous nonfat phase of the fat emulsion. Buttermilk, obtained from the churning of cream during the manufacture of dairy butter, is a highly suitable and desirable component for the nonfat phase, since it contains the actual milkfat globule membranes which coat the milkfat emulsion in dairy cream.

The nature of the emulsion is to a large extent controlled by the protein composition of the dispersing medium. In conventional natural cheese, the milk fat is typically held in a fairly weak emulsion by milkfat globule membranes. During cheese aging, these membranes disintegrate and the milkfat, which had been contained within them, exists as channels of non-emulsified fat trapped in the protein matrix of the cheese. Due to the unique mouthfeel of certain polyol fatty acid polyester, which my tend toward waxiness at high solid fat contents, it may be desirable to control the tightness or stability of the emulsion. Emulsification with skim milk components will result in a thick, strong surface coating of casein micelles on the fat which would be highly resistant to breakdown during cheese aging.

If mixtures of triglyceride fat and polyol fatty acid polyesters are used as the fat phase, it may be desirable to use separate emulsions, with the polyester component tightly emulsified with skim milk components, and the triglyceride fat coated with whey or buttermilk components. The latter emulsion is weaker, and would tend to break down during cheese aging, resulting in the accessibility of free fat to the oral surfaces during mastication. This potentiated form of fat would produce mouthfeel sensations which would be perceived as greater than would normally be attributed to the low levels of triglyceride fat in the product.

The strength of the protein coat at the fat droplet surface is affected by the presence of surfactant type emulsifier molecules. These emulsifiers are well known to those skilled in the art, and include both those which favor water-in-oil emulsions (low hydrophilic/lipophilic balance or low HLB) and those which favor oil-in-water emulsions (high HLB). Those which are suitable for the emulsions of the invention include those with HLB values of about 4 to about 15. Lower HLB emulsifiers may be used in combination to strengthen the interfacial surface coating. Mono- and diesters of fatty acids, phospholipids and various polysorbates are typical examples. Small amounts of these emulsifiers will destabilize the surface coating of protein, thus weakening the emulsion. For example, a highly stabilized emulsion from skim milk and fat may be weakened by addition of lecithin to produce an emulsion which may behave more typically like that found in conventional dairy cream stabilized by milkfat globule membranes.

The same concepts, that is using separate emulsion systems to isolate various functional fat components, may also be used to create functional polyol fatty acid polyester emulsions. For example, high melting polyester which may have a waxy mouthfeel may be emulsified with a stable casein coating, while a low melting or liquid polyester material, which more closely approximates milkfat in its physical properties, may be emulsified with buttermilk or whey preparations to potentiate its lubricious qualities.

Following mixing of the fat phase and the aqueous phase, the mixture is then subjected to a homogenization treatment to fully disperse and coat the fat droplets. The homogenization may be by means of a conventional low pressure homogenizer at a pressure of less than about 3,000 psig. Alternatively, a portion, i.e., from about 25% to about 60%, of the emulsion may be homogenized under high pressure conditions of from about 5,000 to about 15,000 psig. The use of high pressure homogenization for a portion of the emulsion provides a combination of a highly stabilized fat emulsion from the high pressure homogenization and an unstabilized fat from the low pressure homogenization. Such mixture of stabilized emulsion and non-stabilized emulsion results in the formation of improved texture in the natural cheese product. The fat of the emulsion comprises from about 25% to 100% of a polyol fatty acid polyester with the balance being a triglyceride fat.

Sugar and sugar alcohol fatty acid polyesters are among the preferred polyol fatty acid polyesters for use as the low-calorie fatty materials in the present invention and comprise fatty acids and sugars or sugar alcohols as polyols. The term "sugar" is used herein in its conventional sense as generic to mono- and disaccharides. The term "sugar alcohol" is likewise used in its conventional sense as generic to the reduction product of sugars wherein the aldehyde or ketone group has been reduced to an alcohol. The sugars and sugar alcohols preferred for use herein contain from about 4 to about 8 hydroxyl groups.

Examples of suitable monosaccharides are those containing 4 hydroxyl groups such as xylose, arabinose and ribose; the sugar alcohol derived from xylose; i.e., xylitol, is also suitable. The monosaccharide erythrose is not suitable for the practice of this invention since it only contains 3 hydroxyl groups; however, the sugar alcohol derived from erythrose, i.e., erythritol, contains 4 hydroxyl groups and is thus suitable. Among 5 hydroxyl-containing monosaccharides that are suitable for use herein are glucose, mannose, galactose, fructose and sorbose. A sugar alcohol derived from sucrose, glucose or sorbose, e.g., sorbitol, contains 6 hydroxyl groups and is also suitable as the alcohol moiety of the fatty acid ester compounds. Examples of suitable disaccharides are maltose, lactose and sucrose, all of which contain 8 hydroxyl groups.

The sugar or sugar alcohol fatty acid polyesters useful in this invention must contain at least 4 fatty acid ester groups. Sugar or sugar alcohol fatty acid polyester compounds that contain 3 or less fatty acid ester groups are digested, and the products of digestion are absorbed from the intestinal tract in the same manner as ordinary triglyceride fats. The sugar or sugar alcohol fatty acid polyester compounds that contain 4 or more fatty acid ester groups are substantially non-digestible and consequently non-absorbable by the human body. It is not necessary that all of the hydroxyl groups of the sugar or sugar alcohol be esterified with fatty acid, but it is preferable that the polyol contain no more than 3 unesterified hydroxyl groups, and more preferable that it contain no more than 2 unesterified hydroxyl groups. Most preferably, substantially all of the hydroxyl groups of the sugar or sugar alcohol are esterified with fatty acid, i.e., the compounds is substantially completely esterified. The fatty acids esterified to the sugar or sugar alcohol molecule can be the same or mixed.

Preferred sugars or sugar alcohols for preparing the polyesters for use in the present invention are selected from the groups consisting of erythritol, xylitol, sorbitol, glucose and sucrose. Sucrose is especially preferred.

The polyol starting material, e.g., the sugar or sugar alcohol, must have at least four hydroxyl groups and must be esterified on at least four of the hydroxyl groups with a fatty acid containing from about 2 to about 24, preferably from about 8 to about 24 and most preferably from about 14 to 18 carbon atoms. Examples of such fatty acids include caprylic, capric, lauric, myristic, myristoleic, palmitic, palmitoleic, stearic, oleic, ricinoleic linoleic, linolenic, eleostearic, arachidic, arachidonic, behenic and erucic acid. The fatty acids can be derived from naturally occurring or synthetic fatty acids; they can be saturated or unsaturated, including positional or geometrical isomers.

Sucrose fatty acid polyesters are highly preferred polyol polyesters for use as the low-calorie fatty materials in the present invention. The sucrose fatty acid polyesters preferably have the majority of their hydroxyl groups esterified with fatty acids. Production of sucrose fatty acid polyesters usually results in mixtures of sucrose esters having different degrees of esterification.

Preferably, no more than about 35% of the esters are hexaesters or heptaesters, and at least 60%, preferably at least about 70% of the esters are octaesters. It is also most preferred that the polyesters have a total content of penta- and lower esters of not more than about 3%.

The sucrose fatty acid esters are preferably esterified with particular kinds of fatty acids. Preferably, at least about 80% and most preferably at least about 90% of the fatty acids are selected from the group consisting of mixtures of $C_{16:0}$ (palmitic), $C_{18:0}$ (stearic), $C_{18:1}$ (oleic), $C_{18:2}$ (linoleic), $C_{22:0}$ (behenic) and $C_{22:1}$ (erucic) fatty acids, their geometric and positional isomers and mixtures thereof. It is also most preferred that at least about 80% of the fatty acids are selected from the group consisting of mixtures of $C_{16}$ to $C_{18}$ fatty acids.

The polyol fatty acid polyesters used in the compositions of the present invention can be liquid, solid, semisolid or mixtures thereof. It is preferable, however, to use a fatty substance in the solid or semi-solid form, rather than the liquid form, because higher levels can be incorporated without adversely affecting the consistency or taste of the low-calorie synthetic cheese products. This is because the butterfat inherent in a full-fat cheese which is being replaced with the fatty substance is a solid or semi-solid at room temperature.

The solid polyol fatty acid polyesters are defined herein as those which are solids at body temperature, i.e., have a melting point of above about 37° C. (98.6° F.). Non-limiting examples of specific solid polyol fatty acid esters include sucrose octastearate, sucrose octapalmitate, sucrose heptastearate, xylitol pentastearate, galactose, pentapalmitate, and like, saturated polyol polyesters having at least four hydroxyl groups esterified with $C_{10}$-$C_{22}$ saturated fatty acids.

Liquid polyol fatty acid polyesters are defined herein as those which are liquids at body temperatures, i.e., having a melting point of about 37° C. (98.6° F.) or below. In general, liquid esters are those which are made from predominantly unsaturated fatty acids, whereas solid esters are made from predominantly saturated fatty acids. In order to provide liquid polyol fatty acid polyesters, generally at least about half of the fatty acids incorporated into an ester molecule must be unsaturated. Oleic and linoleic acids and mixtures thereof, are especially preferred. The following are non-limiting examples of specific liquid polyol fatty acid polyesters containing at least four fatty acid ester groups suitable for use in the present invention: glucose tetraoleate, the glucose tetraesters of soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of soybean oil fatty acids, xylitol pentaoleate, sucrose tetraoleate, sucrose hexaoleate, sucrose heptaoleate, sucrose octaoleate and mixtures thereof.

The fermented skim milk retentate is then blended with the fatty emulsion to provide a concentrate. Preferably, the concentrate contains from about 60% to about 80% of the skim milk retentate and from about 20% to about 40% of the fatty emulsion. The concentrate contains from about 3% to about 30% of fatty material, including the polyol fatty acid polyester, from about 10% to about 20% of protein and from about 55% to about 75% of water. All percentages used herein are by weight unless otherwise indicated.

The concentrate is then mixed with a milk clotting enzyme commonly used in cheese manufacture and widely available commercially. Perhaps the best known milk clotting enzyme in cheese making is veal rennet. However, a number of other milk clotting enzymes are known in the cheese industry, as for example, microbial rennets, such as *Mucor meheii*. These enzymes are known to cause conversion of kappa casein to para kappa casein in cheese by their action upon kappa casein in the milk. Equivalents to these well known milk clotting enzymes can be utilized if they effect the conversion of kappa casein like the milk clotting enzymes. In conventional cheese making, the coagulating enzymes cause clotting of milk with substantially all of the para kappa casein being formed in the vat coincident with the setting of the milk. Also, the milk clotting enzymes form macro peptides which in conventional cheese manufacture are substantially removed with the whey. When the milk solids are increased, the prior art teaches more rapid coagulation and quicker formation of para kappa casein.

In the process of the invention, coagulation is to be avoided prior to evaporation to provide the end product, but it has been found that para kappa casein is necessary to provide a stable end product, and, in the case of high-solids cheese, typical cheese body and texture. The milk clotting enzymes can be added in such amounts that coagulation is avoided and yet para kappa casein develops in the end product to sufficient levels to provide desired stability and cheese body and texture.

The particular amount of milk clotting enzyme added will vary, depending upon the specific enzyme used and its activity under the conditions of the process. It has been found that, for desired commercial operations, the amount used should cause at least about 65 percent of the kappa casein to be converted to para kappa casein in about three days, but less than 4 days after pre-cheese is produced out of the evaporator. In the case of some milk clotting enzymes, it is necessary to continue holding the product after the indicated conversion to achieve texturization.

The milk clotting enzyme is desirably introduced after formation of the concentrate but before evaporation to higher-solids levels. Preferably, the milk clotting enzyme is introduced into the concentrate within about 30 seconds before evaporation of the filled milk. An alternative method for treating the concentrate prior to evaporation is the method disclosed in U.S. Pat. No. 5,037,659 to Trecker, et al., which is incorporated herein by reference.

This invention contemplates evaporation with concurrent highly turbulent conditions occurring throughout water removal or quiescent evaporation with substantial working of the product after evaporation to provide a pre-cheese. Turbulent evaporation occurs in a swept-surface evaporator, such as a Turba-Film evaporator or a Luwa evaporator. Quiescent evaporation occurs on a vacuum drum dryer, such as a Blaw-Knox vacuum drum dryer system. Turbulent evaporating conditions tend to destabilize the product and high solids product out of the evaporator, if pressed or squeezed, exudes fat and does not provide, at this point, a product having typical cheese body and texture. After evaporation, the pre-cheese has from about 30% to about 40% moisture.

During turbulent evaporation, it is desirable that the temperature of the product not exceed about 75° F. for a number of reasons. High temperatures can affect the casein and salts in the system. It has been found that the pre-cheese temperature may increase in the system used for product removal from the evaporator and the pre-cheese should be collected from the evaporator at a temperature of below about 85° F. The product can be collected in a barrel or other container. The product, after evaporation, should be cured by quickly cooling as by placing the barrel or container in a 45° F. storage room. This product is considered to be a pre-cheese. As indicated, the pre-cheese should be retained under curing conditions until at least about 65% of the kappa casein has been converted to para kappa casein, whereupon it is considered cheese.

Other types of evaporators than swept-surface evaporators, may be used and, while evaporation may be achieved under less turbulent conditions, these types normally collect the product under conditions which manipulate or work the product in an auger conveyor, or the like. This may be a part of a Blaw-Knox vacuum drum dryer system. Therefore, these collected pre-cheeses must likewise be retained for 65% kappa casein conversion to provide cheese.

The high-solids cheese may then be texturized to provide cheese body and texture. On the other hand, if the cheese of the invention is to be used in process cheese manufacture, the texturization step becomes unnecessary, and the pre-cheese or cheese can function in such manufacture in the same manner as cheese made by conventional methods or by the texturization disclosed herein. The semi-soft cheeses may have the body and texture desired, but the para kappa casein provides improved stability.

Various pieces of equipment can be used to effect texturization, but basically, it has been found that the cheese needs to be worked under controlled temperature and manipulative conditions to provide cheese body and texture. During texturization the temperature should be in excess of 105° F. to incorporate fat and should be manipulated at between about 125° F. and 160° F. until an elastic body is achieved.

The texturability of the cheese can be determined by the following test:

Forty pounds of untexturized cheese at a temperature between 50° F. and 60° F. is introduced into a Day mixer employing a sigma blade agitator. A jacketed mixing bowl is provided with 10 psig steam (238° F.) being present in the jacket. The Day mixer is operated at maximum speed of about 135 rpm. The cheese initially becomes oily, yellow and granular but, if texturizable, reincorporates the fat at about 110° F. and achieves a mashed-potato appearance. At about 140° F., the fat is fully reincorporated and the cheese is stringy, elastic and rubbery. The speed is reduced to about 50 rpm and at about 142° F., the cheese masses together, whereupon it is hooped and pressed for one-half hour at 15 psig, with no exuding of oil. The pressed cheese is stored at 45° F. and, when cooled down, has the body and texture of conventionally made cheese.

This test serves to establish texturability of the product of this invention.

Salt is sometimes a necessary ingredient in the cheese. The term "salt" of course, includes salt substitutes. The salt can function in a number of ways in the process, but can also interfere with various operations. As pointed out, salt may be added during fermentation to limit coagulation, but excessive salt can affect bacterial growth during fermentation. Salt can be added prior to evaporation and improve evaporation efficiency by lowering viscosity, but is not necessary for efficient evaporation. Further, salt can be added during evaporation or after evaporation as in conventional cheese manufacture. Thus, salt my be added at several points in the process. Salt my destabilize the cheese at high levels. In any event, salt is added in an amount(s) which provides an end salt content typical of the cheeses being made.

The practice of the invention will be more clearly understood by reference to the following examples.

EXAMPLE I

Skim milk is pasteurized at 162° F. for 16 seconds, cooled and held at 40° F. The pasteurized skim milk is subjected to ultrafiltration to achieve a concentration of 4.75 fold, and then is diafiltered. The diafiltration is run at about 1.5:1 (water-to-concentrate). After diafiltration, ultrafiltration is continued until about 5.28 fold concentration, based upon the original milk volume, is achieved. The ultrafiltration-diafiltration process is conducted to achieve a lactose level of about 0.9%, so that the pH reduction during fermentation will be limited to about 5.2 and to provide milk salts or ash at a level of about 1.3%. The retentate has about 23 to 24% total solids.

The concentrated retentate is then warmed to 70° F. for fermentation. A salt (sodium chloride) solution is added at a level of 0.4% (by weight of salt-to-retentate) to limit coagulation during fermentation. A conventional lactic starter culture is used, specifically, Hansen's Direct Vat Set 970, for effecting the fermentation. The culture is used at a level of about 0.24 milliliters per pound of retentate at 35% total solids. Pregastric esterases (lipase) are added. These enzymes are obtained from Dairyland Food Laboratories, Inc. The pregastric esterases are added at a level of about 0.43 grams per pound of retentate at 35% total solids.

The fermentation is carried out at 70° F. for 10–12 hours and until the fermented retentate reaches a pH of 5.2. After fermentation 0.515% salt (sodium chloride) based on the weight of the retentate, is added, so as to bring the final salt in the cheese at 65% solids, to about 1.7%. After the desired pH level is achieved, the temperature of the fermented retentate is lowered to 60° F.

An emulsion of fatty materials and water is then prepared by forming a premix containing 40% of a sucrose fatty acid polyester, 10% soybean oil, 40% water and 10% fermented skim milk retentate. The premix is subjected to homogenization at 2000 psig to form a fatty emulsion.

A filled milk is prepared by combining 6.5 parts of the fermented skim milk retentate and 3.5 parts of the fatty emulsion in a kettle and mixing for 5 minutes with a propeller type mixer.

The filled milk is at a solids level of about 35% total solids and is then concentrated in a swept surface evaporator, specifically a Turba-Film evaporator, with a positive pump discharge.

A milk clotting enzyme, specifically Novo Rennilase TL, a modified *Mucor meheii* enzyme, is added to the fermented retentate immediately prior to evaporation. The milk clotting enzyme is added to a concentration of 0.1 percent based on cheese and there is no coagulation or undue thickening of the filled milk.

The Turba-Film evaporator is operated so that the temperature of the product in the evaporator is between about 65° and 75° F. with a vacuum of between about 16 and about 22 millimeters of mercury absolute pressure.

The pre-cheese out of the Turba-Film evaporator is collected under a vacuum to remove air and increase density and is filled into barrels.

The barrels, after filling, are placed in a 45° cooler and can be used directly in the manufacture of process cheese, or after conversion of about 75% kappa casein to para kappa casein in about six days, can be texturized. Texturization can be effected in various units.

The cheese has a total solids of 65.0%, a fat of 34.1%, a protein of 26.7%, a salt (sodium chloride) of 1.7% and an ash of 4.0%. There is less than 0.1% lactose in the cheese.

EXAMPLE II

The cheese of Example I with a 75% conversion of kappa casein to para kappa casein is mechanically manipulated in such manner as to provide cheese body and texture. Specifically, the cheese is introduced into a Farinograph Sigma blade mixer with hot water supplied to its jacket at 160° F. 500 grams of cheese is introduced at 58° F. and a pH of about 5.2. The Farinograph mixer is run at maximum RPM with the following results:

| Time/Min | Temp. | Comments |
| --- | --- | --- |
| Start | 58° F. | Crumbly, non-cohesive |
| 1 min. | 91° F. | Oily, yellow |
| 3 min. | 111° F. | Oily, reincorporated "Mashed potato appearance |
| 4 min. | 131° F. | Firming-up |
| 5 min. | 142° F. | Texturized, elastic pieces |

The texturized product has a sheen and is elastic, rubbery and stretchable. The cheese is pressed for one-half hour at 10 psig without oiling off.

EXAMPLE III

Cheese from Example I is introduced into a Werner-Pfleiderer twin-screw extruder having eleven sections. The cheese is fed into the extruder at a pressure of 6.5 psig at a rate of three pounds per minute. The cheese is heated to 145° F. with manipulation and cooled to 135° F. before extrusion. The cheese is like that produced by Example II.

What is claimed is:

1. A method for the manufacture of a natural cheese comprising:
    (a) removing moisture, salts and lactose from skim milk by ultrafiltration and diafiltration to provide a retentate;
    (b) adding a lactic acid producing cheese culture to the retentate and fermenting the retentate to a pH of between about 4.8 and about 5.6 without coagulating said retentate;
    (c) homogenizing a mixture of an aqueous material selected from the group consisting of skim milk, whey, buttermilk, skim milk retentate, fermented skim milk retentate and water and a fat to provide an emulsion containing from about 10% to about 70% fat, said fat comprising from about 25% to about 100% of a polyol fatty acid polyester with the balance being a triglyceride fat;

(d) blending said fermented retentate and said emulsion to provide a concentrate;

(e) adding a milk clotting enzyme to said concentrate prior to evaporating said concentrate;

(f) evaporating moisture from said concentrate to provide a pre-cheese having from about 30% to about 40% moisture; and (g) curing said pre-cheese to provide a natural cheese.

2. A method in accordance with claim 1 wherein the retentate is produced from skim milk having less than about 1% milkfat.

3. A method in accordance with claim 1 wherein said triglyceride fat is milkfat.

4. A method in accordance with claim 1 wherein said polyol fatty acid polyester is selected from the group consisting of esters of sugars and sugar alcohols having at least 4 hydroxyl groups esterified with fatty acids.

5. A method in accordance with claim 4 wherein said fatty acids contain from 2 to about 24 carbon groups.

6. A method in accordance with claim 5 wherein each fatty acid group has from about 6 to about 24 carbon atoms.

7. A method in accordance with claim 6 wherein each fatty acid group has from about 14 to about 18 carbon atoms.

8. A method in accordance with claim 4 wherein the sugar of said sugar fatty acid polyester is selected from the group consisting of sucrose, glucose, xylose, ribose, mannose, arabinose, galactose, fructose, sorbose, maltose, lactose and mixtures thereof.

9. A method in accordance with claim 8 wherein the sugar of said sugar fatty acid ester is sucrose.

10. A method in accordance with claim 1 wherein said fat of said emulsion is a mixture of a triglyceride fat and a polyol fatty acid polyester.

11. A method in accordance with claim 10 wherein said fat mixture comprises from about 5% to about 95% of said polyol fatty acid polyester.

12. A method in accordance with claim 1 wherein at least a portion of said mixture of water and fat is homogenized at a high pressure of at least about 5000 psig with the balance of said mixture being homogenized at a low pressure of less than about 4000 psig.

13. A method in accordance with claim 12 wherein said high pressure homogenization is at a pressure of from about 5000 psig to about 15,000 psig.

14. A method in accordance with claim 1 wherein said emulsion and said fermented retentate are blended at levels sufficient to provide from about 3% to about 30% fat in said blend.

15. A method in accordance with claim 1 wherein said skim milk retentate has a moisture level of between about 75% and about 85%, a salt level between about 0.7% and about 2.5% and lactose between about 0.8% and about 1.8%.

16. A method in accordance with claim 1 wherein said evaporation takes place under turbulent conditions in a vacuum.

17. A method in accordance with claim 16 wherein the temperature of said blend during evaporation does not exceed about 85° F.

18. A method in accordance with claim 1 wherein the cheese is texturized by manipulation at temperatures above about 125° F. until cheese body and texture is developed.

19. A method in accordance with claim 1 wherein said concentrate has from about 55% to about 75% of water.

* * * * *